(12) United States Patent
Johnson et al.

(10) Patent No.: US 10,751,766 B2
(45) Date of Patent: Aug. 25, 2020

(54) LASER ABLATION SYSTEM HAVING A MOVEABLE CARRIAGE WITH CLAMPING SYSTEM CONFIGURED TO CLAMP AND SEAL AGAINST A WORKPIECE

(71) Applicant: The Boeing Company, Chicago, IL (US)

(72) Inventors: Matthew C. Johnson, Edgewood, WA (US); Bruce J. Hanninen, Renton, WA (US)

(73) Assignee: The Boeing Company, Chicago, IL (US)

( * ) Notice: Subject to any disclaimer, the term of this patent is extended or adjusted under 35 U.S.C. 154(b) by 304 days.

(21) Appl. No.: 15/814,281

(22) Filed: Nov. 15, 2017

(65) Prior Publication Data

US 2019/0143382 A1   May 16, 2019

(51) Int. Cl.
  *B23K 26/36*   (2014.01)
  *B08B 7/00*    (2006.01)
  *B23K 26/361*  (2014.01)
  *B23K 26/16*   (2006.01)
  *B23K 26/402*  (2014.01)
  *B23K 101/34*  (2006.01)
  *B23K 103/00*  (2006.01)

(52) U.S. Cl.
  CPC ............ *B08B 7/0042* (2013.01); *B23K 26/16* (2013.01); *B23K 26/36* (2013.01); *B23K 26/361* (2015.10); *B23K 26/402* (2013.01); *B23K 2101/35* (2018.08); *B23K 2103/54* (2018.08)

(58) Field of Classification Search
  CPC ...... B23K 26/36; B23K 26/361; B23K 26/16; B23K 26/402
  USPC ..................................... 219/67–69
  See application file for complete search history.

(56) References Cited

U.S. PATENT DOCUMENTS

| | | | |
|---|---|---|---|
| 5,780,806 A | 7/1998 | Ferguson et al. | |
| 6,462,301 B1* | 10/2002 | Scott | B23K 26/04 219/121.6 |
| 7,525,065 B2 | 4/2009 | Engler et al. | |
| 7,947,919 B2* | 5/2011 | Sukhman | B08B 7/0042 219/121.67 |
| 10,363,586 B2* | 7/2019 | Barclay | B23K 26/362 |
| 2006/0000813 A1 | 1/2006 | Engler et al. | |
| 2007/0151958 A1* | 7/2007 | Modra | B23K 26/16 219/121.67 |

\* cited by examiner

*Primary Examiner* — Jennifer C Chiang
(74) *Attorney, Agent, or Firm* — Yee & Associates, P.C.

(57) ABSTRACT

A laser ablation system comprises a volume configured to contain a workpiece and a carriage configured to move within the volume relative to a workpiece. The carriage comprises a clamping system, a laser enclosure, and a laser ablation work head within the laser enclosure. The clamping system is configured to clamp the workpiece and seal against a portion of the workpiece.

20 Claims, 12 Drawing Sheets

US 10,751,766 B2

LASER ABLATION SYSTEM HAVING A MOVEABLE CARRIAGE WITH CLAMPING SYSTEM CONFIGURED TO CLAMP AND SEAL AGAINST A WORKPIECE

BACKGROUND INFORMATION

1. Field

The present disclosure relates generally to removing material using laser ablation and, more specifically, to a laser ablation system and method for removing material from a portion of a workpiece sealed within a moveable carriage.

2. Background

Aluminum aircraft parts have ground bond contact locations. The ground bond contact locations desirably have bare aluminum without coatings. Surrounding portions of the aluminum aircraft parts are covered in a coating, such as a paint or a primer.

Prior to applying a coating, maskants are created and applied manually to the ground bond contact locations. After applying the coating, the maskants are removed to reveal the aluminum beneath the maskants.

Applying maskants is performed by operators with training and expertise. Applying maskants is time-limited by manual performance.

Therefore, it would be desirable to have a method and apparatus that take into account at least some of the issues discussed above, as well as other possible issues.

SUMMARY

An illustrative embodiment of the present disclosure provides a laser ablation system. The laser ablation system comprises a volume configured to contain a workpiece and a carriage configured to move within the volume relative to a workpiece. The carriage comprises a clamping system, a laser enclosure, and a laser ablation work head within the laser enclosure. The clamping system is configured to clamp the workpiece and seal against a portion of the workpiece.

Another illustrative embodiment of the present disclosure provides a method. A carriage of a laser ablation system is moved relative to a workpiece within a volume of the laser ablation system, the carriage comprising a laser enclosure and a laser ablation work head within the laser enclosure. The workpiece is clamped using a clamping system of the carriage. The carriage is sealed against the workpiece using the clamping system of the carriage. An ablation pattern is executed on the workpiece using the laser ablation work head and a pulsed laser source of the laser ablation system, wherein the pulsed laser source is operably connected to the laser ablation work head. Effluent is extracted using an effluent extraction system of the laser ablation system while executing the ablation pattern.

A further illustrative embodiment of the present disclosure provides a laser ablation system. The laser ablation system comprises a carriage, and an effluent extraction system. The carriage is configured to create a working environment for laser ablation, wherein the carriage is configured to move relative to a workpiece. The working environment is smaller than the workpiece. The carriage comprises a clamping system, a light-tight laser enclosure, and a laser ablation work head within the laser enclosure. The clamping system is configured to seal against a portion of the workpiece, wherein the clamping system is configured to secure the workpiece, create a light-tight seal to block laser emissions, and create a negative pressure differential to prevent the escape of effluent. The effluent extraction system is configured to remove effluent from within the laser enclosure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that rather than mask bare substrate material from coatings, locations of coatings may be selectively removed from a substrate material. The illustrative embodiments recognize and take into account that selective coating removal may be preferred to selective masking in some examples. The illustrative embodiments recognize and take into account that selective coating removal may reduce manufacturing time. The illustrative embodiments recognize and take into account that selective coating removal may be performed by automated systems. The illustrative embodiments recognize and take into account that selective coating removal may reduce manufacturing costs. The illustrative embodiments recognize and take into account that selective coating removal may reduce manufacturing waste.

The illustrative embodiments recognize and take into account that laser ablation is a method of coating removal. The illustrative embodiments recognize and take into account that laser ablation is performed in laser enclosures. The illustrative embodiments recognize and take into account that laser enclosures may be large light-tight boxes or rooms. The illustrative embodiments recognize and take into account that laser enclosures are created large enough to encompass the whole of a workpiece to receive laser ablation.

The illustrative embodiments recognize and take into account that laser enclosures for large aircraft parts, such as an aircraft wing or other large component, may be undesirably large. The illustrative embodiments further recognize and take into account that laser enclosures for aircraft parts or other parts may be undesirably expensive to build and/or operate.

The illustrative embodiments recognize and take into account that laser ablation results in effluent. The illustrative embodiments recognize and take into account that effluent from laser ablation may take the form of a fine dust. The illustrative embodiments recognize and take into account that effluent from laser ablation may take the form of fumes. The illustrative embodiments recognize and take into account that it may be desirable to limit operator exposure to some types of effluent. The illustrative embodiments further recognize and take into account that for large laser enclosures, routine maintenance may include cleaning remaining effluent from within the laser enclosure.

Figure 1:
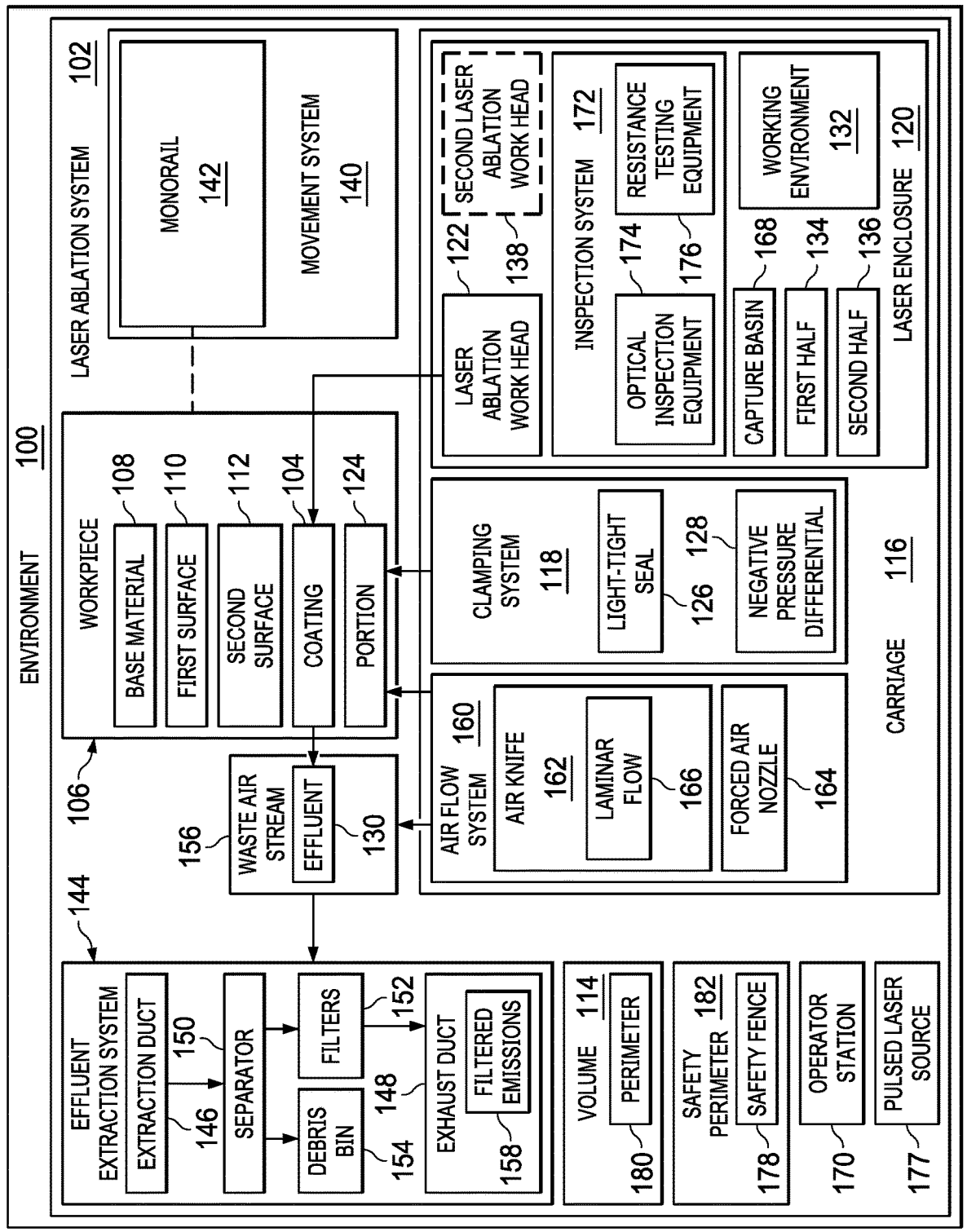
FIG. 1 is an illustration of a block diagram of a manufacturing environment in which a laser ablation system operates in accordance with an illustrative embodiment.

Referring now to the figures and, in particular, with reference to FIG. 1, an illustration of a block diagram of a manufacturing environment in which a laser ablation system operates is depicted in accordance with an illustrative embodiment. In environment 100, laser ablation system 102 selectively removes coating 104 from workpiece 106.

The ablation process removes coating without negatively affecting workpiece 106. Laser ablation system 102 ablates coating 104 only from designated areas.

Laser ablation system 102 desirably ablates coating 104 from a surface, such as surface 110 or surface 112, of workpiece 106 down to base material 108. The laser ablation process desirably does not create inconsistencies in base material 108.

Workpiece 106 may take any desirable form. Workpiece 106 may be a part or several combined parts of any type of platform for example, a mobile platform, a stationary platform, a land-based structure, an aquatic-based structure, and a space-based structure. More specifically, the structure, may be a surface ship, a tank, a personnel carrier, a train, a spacecraft, a space station, a satellite, a submarine, an automobile, a power plant, a bridge, a dam, a house, a manufacturing facility, a building, and other suitable. In some illustrative examples, workpiece 106 takes the form of one or more aircraft parts. In some illustrative examples, workpiece 106 may be a structural component of airplane wings.

Workpiece 106 is formed of base material 108 and has first surface 110 and second surface 112. First surface 110 and second surface 112 are on opposite sides of workpiece 106.

In some illustrative examples, base material 108 is a metallic material. In some more specific illustrative examples, base material 108 is aluminum.

Coating 104 may take any desirable form. In some illustrative examples, coating 104 is a primer. In some illustrative examples, coating 104 is a paint. In some other illustrative examples, coating 104 is a layer of oxidation. In other illustrative examples, coating 104 may take the form of a layer of contamination, a layer of radar absorbing material, a layer of anodization, a layer of lubricant, a layer of photoresist, or a layer of electroplating.

Laser ablation system 102 comprises volume 114 configured to contain workpiece 106 and carriage 116 configured to move within volume 114 relative to workpiece 106. Carriage 116 comprises clamping system 118, laser enclosure 120, and laser ablation work head 122 within laser enclosure 120.

Laser enclosure 120 is constructed in such a manner as to completely contain laser emissions. For example, laser enclosure 120 is constructed to be entirely light-tight. Any gaps in laser enclosure 120 including at door and access panel locations, are closed to keep laser enclosure 120 light-tight. Further, any gaps or pinholes in the roof or wall joints are sealed to make laser enclosure 120 light-tight.

In some illustrative examples, all access ports and removable panels of laser enclosure 120 are configured to prevent unintended emission of laser energy through a removed panel. Access ports or removable panels of laser enclosure 120 are securely attached to carriage 116.

Clamping system 118 is configured to secure workpiece 106 and seal against portion 124 of workpiece 106. Clamping system 118 is configured to create light-tight seal 126 to block laser emissions and to create negative pressure differential 128 to prevent the escape of effluent 130. Depending on the type of coating 104, effluent 130 may have specialized handling requirements.

Carriage 116 is configured to create working environment 132 for laser ablation within volume 114. Working environment 132 is smaller than volume 114. Working environment 132 is smaller than workpiece 106. By reducing the space within working environment 132, a volume of fume extraction is also reduced. Working environment 132 is a space in which laser ablation is performed. Working environment 132 is contained within carriage 116 when carriage 116 is sealed against workpiece 106. Laser ablation work head 122 moves within working environment 132 to ablate coating 104.

Laser enclosure 120 of carriage 116 comprises two opposing halves. As depicted, laser enclosure 120 of carriage 116 has first half 134 and second half 136. When workpiece 106 is present in volume 114, first half 134 will seal against first surface 110 of workpiece 106. When workpiece 106 is present in volume 114, second half 136 will seal against second surface 112 of workpiece 106.

In some illustrative examples, laser ablation work head 122 moves between first half 134 and second half 136 to work on either first surface 110 or second surface 112. In other illustrative examples, laser ablation work head 122 only works within first half 134 of laser enclosure 120. In these illustrative examples, laser ablation work head 122 works on first surface 110 when first half 134 seals against first surface 110. In some illustrative examples, second laser ablation work head 138 is optionally present in second half 136 of laser enclosure 120. In other illustrative examples, workpiece 106 may be repositioned such that first half 134 seals against second surface 112 and laser ablation work head 122 works on second surface 112.

Laser ablation system 102 further comprises movement system 140 configured to move workpiece 106 into volume 114 of laser ablation system 102. Movement system 140 takes any desirable form such as a conveyor system, a track, a roller system, a robotic arm, or any other desirable form.

In some illustrative examples, movement system 140 is monorail 142, wherein workpiece 106 is suspended from monorail 142. In some illustrative examples, when workpiece 106 is suspended from monorail 142, workpiece 106 is free-hanging from monorail 142.

In some illustrative examples, workpiece 106 is suspended using straps under a load bar of workpiece 106. When workpiece 106 is free-hanging from monorail 142, clamping system 118 is configured to immobilize workpiece 106 for laser ablation by laser ablation work head 122.

Clamping system 118 effectively immobilizes workpiece 106 while simultaneously creating light-tight seal 126 and containing effluent 130 around the perimeter of the laser. By immobilizing workpiece 106, clamping system 118 prevents or reduces swaying or other motion of workpiece 106.

Clamping system 118 creates a working interface between the two halves of laser enclosure 120, first half 134 and second half 136. Clamping system 118 contains any desirable components. For example, clamping system 118 may contain at least one of bladders, pneumatic bladders, air-over-hydraulics, servo motors, vacuum, or any other desirable components.

Clamping system 118 may also be referred to as a "soft clamping system." A barrier is created when clamping system 118 engages, to contain airborne effluent 130. When closed, clamping system 118 seals onto workpiece 106, forming a light-tight (Class 1) barrier to block laser emissions. Light-tight seal 126 covers all sides, including top and bottom, of portion 124 regardless of orientation of workpiece 106.

Clamping system 118 creates a light-tight barrier with workpiece 106, despite occasional penetrations (holes through workpiece 106) which occur at known locations. In some illustrative examples, clamping system 118 conforms to the part geometry of workpiece 106 such that it still effectively blocks laser emissions and contains effluent 130.

Clamping system 118 desirably provides equivalent clamping and sealing capability without a workpiece, such as workpiece 106, present in laser ablation system 102. Clamping system 118 does not mar, nick, dent, scratch, abrade, or otherwise affect workpiece 106 or its surfaces, including first surface 110 and second surface 112, in an adverse manner.

The materials forming clamping system 118 are selected such that outgassing materials are not chosen. Clamping system 118 is also formed of non-combustible materials or self-extinguishing materials.

During ablation, clamping system 118 prevents laser energy and effluent 130 from escaping laser enclosure 120. Effluent extraction system 144 extracts effluent 130 from laser ablation system 102 while executing an ablation pattern using laser ablation work head 122.

Effluent extraction system 144 filters effluent 130 generated by the ablation process. Effluent extraction system 144 is configured to produce filtered emissions that meet regulatory requirements.

Effluent extraction system 144 comprises a plurality of components to remove effluent 130 from carriage 116 and separate effluent 130 from other waste components. Effluent extraction system 144 is configured to remove effluent 130 from within laser enclosure 120. Effluent extraction system 144 comprises any desirable type and quantity of components. As depicted, effluent extraction system 144 comprises extraction duct 146, exhaust duct 148, separator 150, filters 152, and debris bin 154.

Extraction duct 146 removes effluent 130 from working environment 132 of carriage 116 and channels effluent 130 to the remainder of effluent extraction system 144. Effluent 130 is removed from waste air stream 156 using separator 150, filters 152, and debris bin 154. Exhaust duct 148 vents the remaining filtered emissions 158 outside of environment 100.

Components of effluent extraction system 144 may be positioned in any desirable location. In some illustrative examples, all components of effluent extraction system 144 are within environment 100. In some illustrative examples, all components of effluent extraction system 144 are within volume 114. In some illustrative examples, all components of effluent extraction system 144 are within carriage 116.

In some illustrative examples, portions of effluent extraction system 144 may be positioned outside of environment 100. For example, portions of effluent extraction system 144 may be positioned outside of a manufacturing building. By positioning portions of effluent extraction system 144 outside of environment 100, effluent extraction system 144 may be flexible to changes of base material 108 or coating 104.

For example, a quantity of filters 152, a type of filters 152, a grade of filters 152, or other characteristics of filters 152 may change depending upon features of coating 104. For example, environmental standards for exhaust of coating 104 may affect the quantity of filters 152 present in laser ablation system 102.

In some illustrative examples, extraction duct 146 may desirably vent waste air stream 156 outside of a manufacturing building. When extraction duct 146 vents waste air stream 156 outside of the building, effluent extractions system 144 may have a greater flow.

In some other illustrative examples, the entirety of effluent extraction system 144 may be positioned on carriage 116. Having effluent extraction system 144 on carriage 116 increases the size, weight, and complexity of carriage 116.

Extraction duct 146 is constructed of a durable material with a smooth inner wall to prevent pooling. Materials for extraction duct 146 have high temperature and abrasion resistance. When extraction duct 146 is a plastic, extraction duct 146 is UL94 rated and lined with braided bonding straps to ensure static dissipation.

Ducting for at least one of extraction duct 146 or exhaust duct 148 may make use of hardware such as rails, covers, or retract devices to provide effective seals and ensure durable production service. Duct design and construction for at least one of extraction duct 146 or exhaust duct 148 provides relatively simple replacement of duct sections.

In some illustrative examples, extraction duct 146 includes at least one in-line airflow meter (not depicted). In these illustrative examples, the at least one in-line airflow meter provides measurements for troubleshooting purposes.

In some illustrative examples, extraction duct 146 includes a spark suppressor (not depicted). In some illustrative examples, the spark suppressor is installed prior to filters 152. In these illustrative examples, the spark suppressor is sized to function throughout the full flow range generated by the effluent extraction system 144. For example, the spark suppressor is sized to function when filters 152 are clean or when filters 152 are caked.

Separator 150 is configured to separate solid effluent 130 created by the ablation process from the waste air stream 156. Separator 150 desirably provides a particle separation of at least 90% efficiency.

Discharge from separator 150 is deposited into debris bin 154. In some illustrative examples, debris bin 154 includes liners, such as bags. Debris bin 154 is configured for hygienic and efficient capture and disposition of effluent 130.

Solid debris isolated by separator 150 is deposited in debris bin 154 while the remainder of waste air stream 156 is sent through filters 152. In some illustrative examples, effluent extraction system 144 includes multi-stage filtration. In these illustrative examples, filters 152 include a series of different types of filters.

Filters 152 are desirably removable and commonly available. In some illustrative examples, effluent extraction system 144 includes a reverse-air purge system to increase filter life. In these illustrative examples, a residue chute may be provided to remove residue after it is blown off of filters 152.

In some illustrative examples, effluent extraction system 144 comprises HEPA After-Filters for fume extraction of effluent 130 particles. In some illustrative examples, an activated charcoal filtration system is present in effluent extraction system 144 to eliminate fumes, such as volatile organic compounds, and odors from waste air stream 156.

Air flow system 160 directs air within carriage 116. Air flow system 160 performs a plurality of functions. Air flow system 160 directs effluent 130 to effluent extraction system 144. Air flow system 160 aids in extraction of effluent 130, in the form of fumes and dust, from laser enclosure 120 by directing air within laser enclosure 120 of carriage 116.

Air flow system 160 comprises any desirable combination of air control or direction components. For example, air flow system 160 may comprise any desirable quantity of or combination of air purge, air knife, or forced air nozzles. As depicted, air flow system 160 comprises air knife 162 and forced air nozzle 164. Air knife 162 provides laminar flow 166 to direct effluent 130 towards effluent extraction system 144. In some illustrative examples, laminar flow 166 takes the form of high velocity downward airflow. In these illustrative examples, air knife 162 is configured to provide high velocity downward airflow across portion 124. Air knife 162 is desirably configured to provide high velocity downward airflow across the laser ablation site on workpiece 106.

In some illustrative example, air knife 162 is an ionized air knife. In some illustrative examples, first half 134 and second half 136 of laser enclosure 120 includes at least one high-flow, low-noise, ionized air knife 162 mounted above workpiece 106 and oriented downward. Air knife 162 produces a fast-moving flow of laminar air, laminar flow 166, downward across the ablation site of workpiece 106. Downward laminar flow 166 from air knife 162 is directed such that effluent 130 is forced downward toward extraction duct 146 of effluent extraction system 144. In some illustrative examples, the mounting location of air knife 162 may be configured to draw additional incoming air from an intake louver across the ablation site on workpiece 106.

In some illustrative examples, capture basin 168 is positioned within carriage 116 prior to extraction duct 146. In these illustrative examples, downward laminar flow 166 from air knife 162 is directed such that effluent 130 is forced downward toward capture basin 168 and into extraction duct 146.

When present, capture basin 168 travels with carriage 116. In some illustrative examples, capture basin 168 acts as the floor of laser enclosure 120. In some illustrative examples, capture basin 168 functions as a mobile downdraft booth. Inside of laser enclosure 120, effluent 130 is forced by downward airflow through capture basin 168 and into extraction duct 146.

In some illustrative examples, air knife 162 is ionized. Ionization neutralizes static charge generated by the plasma plume during ablation. Neutralizing static charge desirably reduces the attraction between airborne effluent 130 and components of laser ablation system 102. For example, neutralizing static charge desirably reduces the attraction between effluent 130 and laser ablation work head 122. Neutralizing static charge desirably reduces the attraction between effluent 130 and the laser optics, camera lenses, and similar devices inside laser enclosure 120.

Air flow system 160 also includes forced air nozzle 164. In some illustrative examples, forced air nozzle 164 takes the form of a dedicated air knife. In some illustrative examples, forced air nozzle 164 is positioned in front of a portion of laser ablation work head 122. In some illustrative examples, forced air nozzle 164 is positioned in front of a final lens of laser ablation work head 122. Forced air nozzle 164 is configured to reduce contamination on laser ablation work head 122 from effluent 130. More specifically, forced air nozzle 164 is configured to reduce contamination on a final lens or lens cover plate of laser ablation work head 122 from effluent 130. In some illustrative examples, forced air nozzle 164 is mounted to laser ablation work head 122. In some illustrative examples, forced air nozzle 164 is mounted to laser ablation work head 122, oriented downward to protect the laser optics. Forced air nozzle 164 may be centered on the field of view of laser ablation work head 122.

In some illustrative examples, forced air nozzle 164 is part of an I/O controlled, regulated pneumatic circuit. Forced air nozzle 164 reduces or prevents effluent 130 from remaining on parts, such as workpiece 106, after processing. Forced air nozzle 164 desirably does not create a source of contamination to the laser optics, cameras, or areas outside of laser enclosure 120.

Forced air nozzle 164 may be used in any desirable fashion. In some illustrative examples, forced air nozzle 164 is used in a programmed continuous air fashion. In a programmed continuous air fashion, forced air nozzle 164 provides air directed at the scan field throughout an ablation process. In some illustrative examples, forced air nozzle 164 is used in a programmed pulse manner. In a programmed pulse fashion, forced air nozzle 164 provides air at the completion of each ablation pattern. In some illustrative examples, forced air nozzle 164 is used in a manual pulse fashion. In a manual pulse fashion, forced air nozzle 164 provides air when commanded from operator station 170 or any other desirable operator input location.

In some illustrative examples, laser ablation system 102 is optionally configured to inspect ablated areas of workpiece 106. In these illustrative examples, laser ablation system 102 includes inspection system 172. Inspection system 172 takes any desirable form. In some illustrative examples, inspection system 172 includes at least one of optical inspection equipment 174 or resistance testing equipment 176.

In some illustrative examples, an optical inspection is performed by optical inspection equipment 174 after performing ablation and prior to moving carriage 116 relative to workpiece 106. In some illustrative examples, an optical inspection is performed by optical inspection equipment 174 after performing an ablation pattern and prior to moving laser ablation work head 122 to a next ablation pattern. In some illustrative examples, the optical inspection may be used as an in-process check to confirm ablation quality, location, depth, or coverage.

In some illustrative examples, resistance testing equipment 176 of inspection system 172 inspects and records the electrical resistance of the ablated ground bond contact areas in an automated manner. In some illustrative examples, resistance testing equipment 176 includes a digital ohmmeter. Inspection system 172 is configured such that inspection system 172 does not scratch, dimple, or otherwise mark workpiece 106.

Pulsed laser source 177 provides laser energy to laser ablation work head 122. Pulsed laser source 177 may be located in any desirable location. In some illustrative examples, pulsed laser source 177 is located on carriage 116 outside of laser enclosure 120. Pulsed laser source 177 is desirably located outside of laser enclosure 120 to reduce exposure to effluent 130.

In some illustrative examples, pulsed laser source 177 is located outside of volume 114. Having pulsed laser source 177 outside of volume 114 reduces the weight of carriage 116. Having pulsed laser source 177 outside of volume 114 provides a stationary laser source. When pulsed laser source 177 is located outside of volume 114, laser fibers carry laser energy to laser ablation work head 122 in carriage 116.

Operator station 170 is positioned outside of volume 114 to keep operators away from laser operations. Operator station 170 is positioned outside of volume 114 to keep operators away from carriage 116 while carriage 116 moves within volume 114.

Safety fence 178 surrounds at least a portion of perimeter 180 of volume 114. Operator station 170 is positioned outside of safety fence 178. Safety fence 178 forms part of safety perimeter 182. Safety perimeter 182 may also include frames or other structures to identify volume 114 of laser ablation system 102 within environment 100.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The illustration of environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, although air flow system 160 is described as having air knife 162, in some other examples, air flow system 160 may instead include directed fans, air curtains, or other desirable directed air equipment.

As another example, laser enclosure 120 may include sufficient illumination to observe the process inside of working environment 132. In this example, the lighting is located to allow visibility of the ablation process as well as ablated portions of workpiece 106.

In a further example, optional viewing windows are provided in carriage 116. In some illustrative examples, certified laser-safe viewing windows are provided to allow maintenance and engineering personnel to directly observe the laser ablation process.

In some illustrative examples, viewing windows are layered assemblies consisting of the desired optical density laser-certified window core, and can be sandwiched between shatter-proof, scratch-resistant glass or polycarbonate.

In yet a further illustrative example, workpiece 106 may be oriented in any desirable fashion. For example, workpiece 106 may not be vertical within volume 114. In some illustrative examples, workpiece 106 may be parallel to the manufacturing floor. In these illustrative examples, rather than using monorail 142, workpiece 106 may be held on a table or any other desirable structure.

In another illustrative example, additional carriages may be present in laser ablation system 102. For example, a second carriage configured to move within the volume relative to the workpiece may be provided. The second carriage may comprise a second clamping system configured to clamp the workpiece and seal against the workpiece, a second laser enclosure, and a second laser ablation work head within the second laser enclosure. Although only a second carriage is discussed, any desirable quantity of carriages may be provided.

Figure 2:
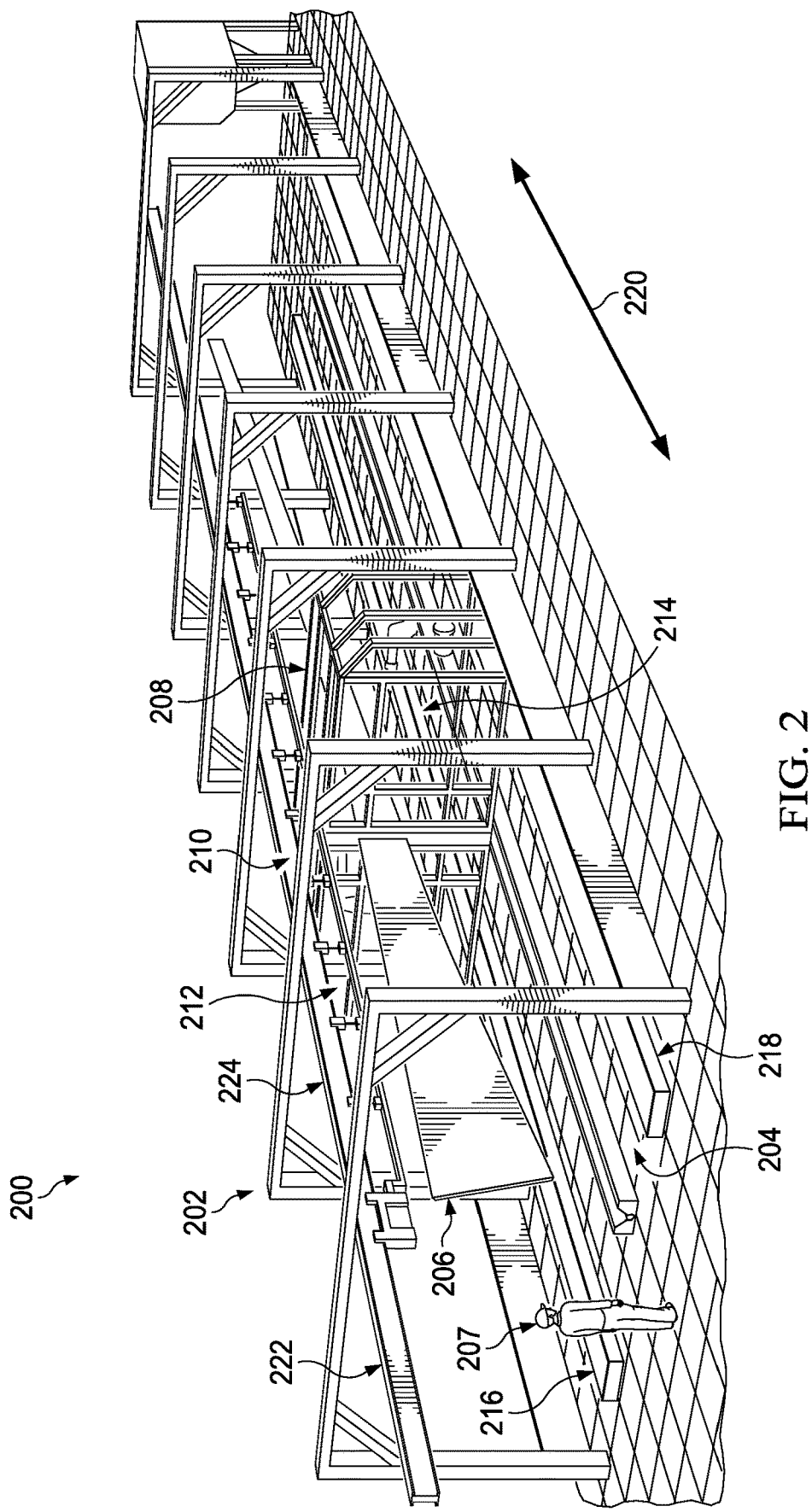
FIG. 2 is an illustration of an isometric view of a laser ablation system with one carriage in accordance with an illustrative embodiment.

Turning now to FIG. 2, an illustration of an isometric view of a laser ablation system with one carriage is depicted in accordance with an illustrative embodiment. Laser ablation system 200 is a physical implementation of laser ablation system 102 of FIG. 1. Laser ablation system 200 has safety perimeter 202 surrounding volume 204 configured to contain workpiece 206. Safety perimeter 202 is configured to restrict operator entry. Safety perimeter 202 is configured to keep operator 207 from entering volume 204 while operations are performed on workpiece 206. Safety perimeter 202 is light penetrable.

Carriage 208 is configured to create a working environment for laser ablation within volume 204. Carriage 208 is configured to move within volume 204 relative to workpiece 206. Carriage 208 may be referred to as a moveable carriage.

Carriage 208 has light-tight laser enclosure 210. Light-tight laser enclosure 210 contains laser energy from a laser ablation work head (not depicted) within laser enclosure 210.

Laser enclosure 210 of carriage 208 comprises two opposing halves, first half 212 and second half 214. First half 212 is moveable within volume 204 along track 216. Second half 214 is moveable within volume 204 along track 218.

Carriage 208 moves in direction 220 using track 216 and track 218 to position carriage 208 to perform laser ablation operations on workpiece 206. Carriage 208 performs laser ablation operations in a stepwise fashion across workpiece 206.

Movement system 222 is configured to move workpiece 206 into volume 204 of laser ablation system 200. As depicted, movement system 222 is monorail 224 and workpiece 206 is suspended from monorail 224. A clamping system (not depicted) of carriage 208 is configured to immobilize workpiece 206 for laser ablation by the laser ablation work head.

Figure 3:
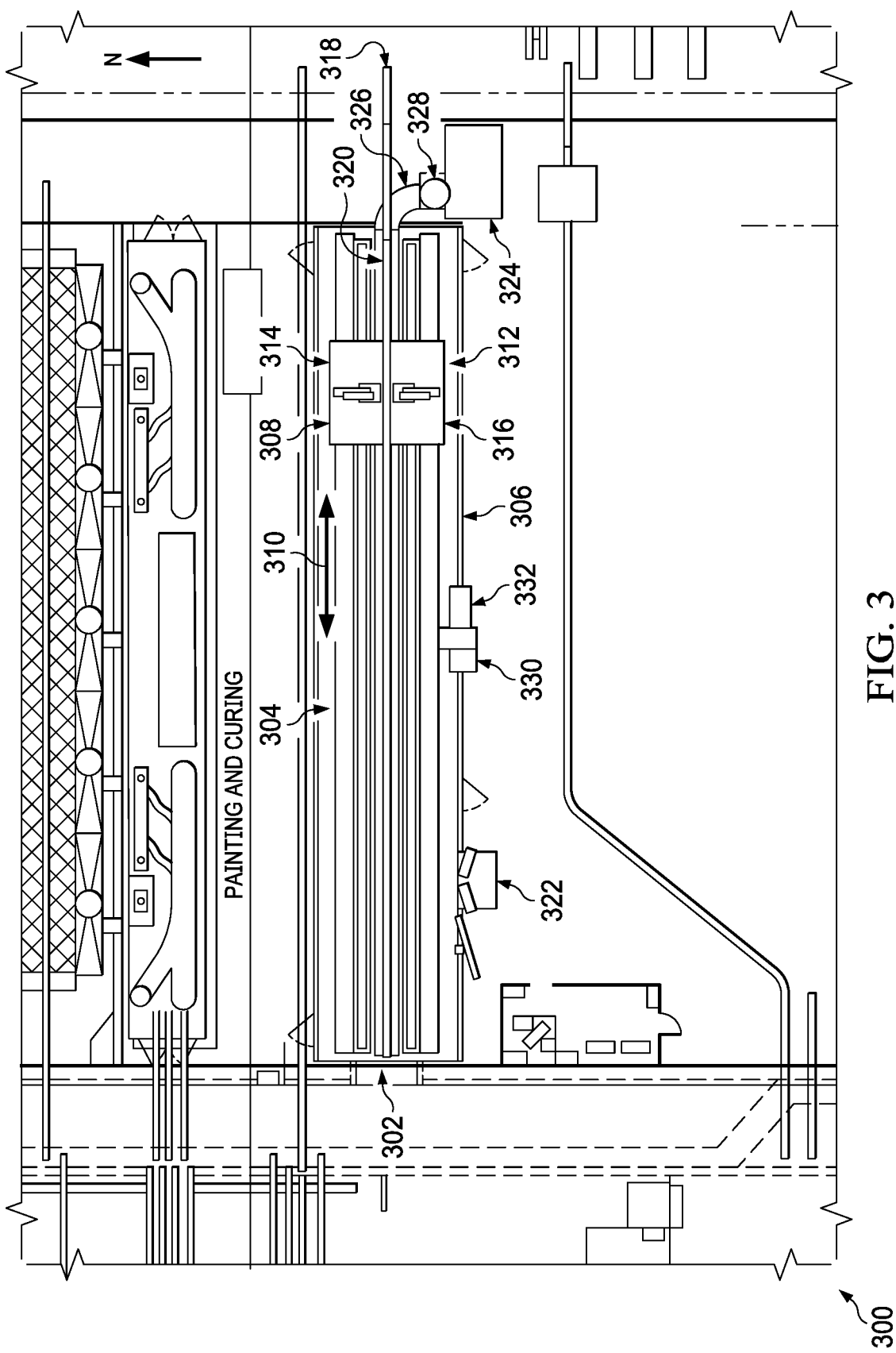
FIG. 3 is an illustration of a floor plan of a manufacturing environment with a laser ablation system with one carriage in accordance with an illustrative embodiment.

Turning now to FIG. 3, an illustration of a floor plan of a manufacturing environment with a laser ablation system with one carriage is depicted in accordance with an illustrative embodiment. Floor plan 300 is a two-dimensional depiction of a portion of a manufacturing environment, such as manufacturing environment 100 of FIG. 1. Laser ablation system 302 is a two-dimensional depiction of a layout of a physical implementation of laser ablation system 102 of FIG. 1. Laser ablation system 302 may be a layout of laser ablation system 200 of FIG. 2.

Laser ablation system 302 has volume 304 configured to contain a workpiece (not depicted). Safety perimeter 306 surrounds volume 304. Safety perimeter 306 is configured to restrict operator entry. Safety perimeter 306 is light penetrable.

Carriage 308 is configured to create a working environment for laser ablation within volume 304. The working environment is contained within carriage 308 when carriage 308 is clamped against a workpiece. Carriage 308 is configured to move within volume 304 relative to a workpiece. Carriage 308 moves within volume 304 in direction 310. Carriage 308 comprises laser enclosure 312. Laser enclosure 312 of carriage 308 comprises two opposing halves, first half 314 and second half 316.

Movement system 318 is configured to move a workpiece into volume 304 of laser ablation system 302. As depicted, movement system 318 is monorail 320. First half 314 and second half 316 are positioned on opposite sides of monorail 320.

As depicted, operator station 322 is positioned outside of safety perimeter 306. In some illustrative examples, systems operably connected to carriage 308 may also be positioned outside of safety perimeter 306. In some illustrative examples, utilities, such as electricity, pneumatics, or other utilities are positioned outside of safety perimeter 306.

As depicted, portions of effluent extraction system 324 are positioned outside of safety perimeter 306. As depicted, extraction duct 326 directs a waste air stream from carriage 308 to separator 328. Additional components of effluent extraction system 324 are not depicted for clarity.

As depicted, laser source 330 and associated chiller 332 are positioned outside of safety perimeter 306. In some other non-depicted illustrative examples, laser source 330 is attached to carriage 308.

Figure 4:
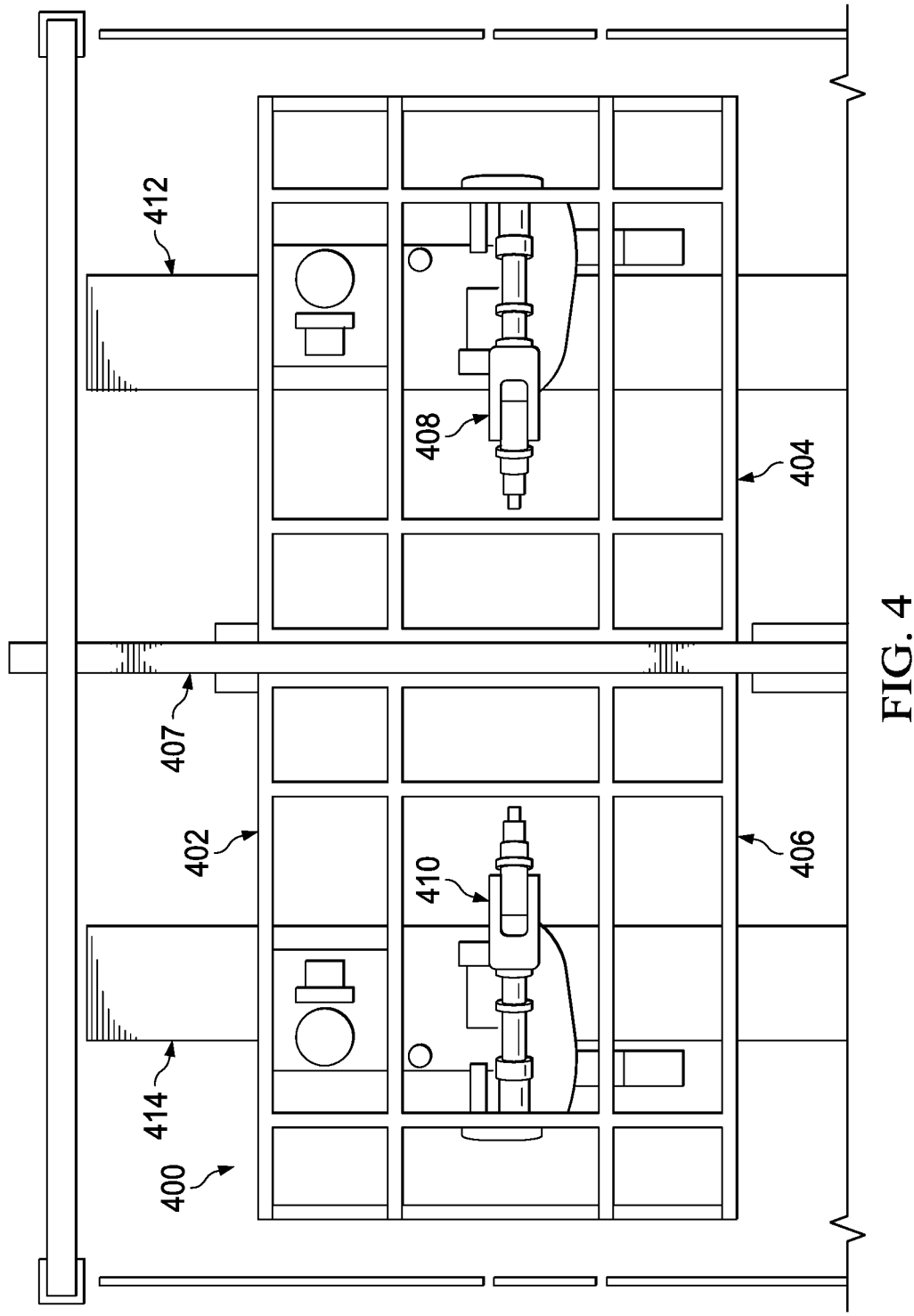
FIG. 4 is an illustration of a top view of a carriage of a laser ablation system with dual laser ablation work heads in accordance with an illustrative embodiment.

Turning now to FIG. 4, an illustration of a top view of a carriage of a laser ablation system with dual laser ablation work heads is depicted in accordance with an illustrative embodiment. Carriage 400 is a physical implementation of carriage 116 of FIG. 1. In some illustrative examples, carriage 400 is the same as carriage 208 of FIG. 2. Carriage 400 may be an implementation of carriage 308 of FIG. 3.

As depicted, carriage 400 has laser enclosure 402. In this illustrative example, laser enclosure 402 is depicted as transparent only for demonstrative purposes. In this illustrative example, laser enclosure 402 is depicted as transparent to view inside of laser enclosure 402. In operation, laser enclosure 402 is light-tight and opaque.

Laser enclosure 402 has two opposing halves, first half 404 and second half 406. First half 404 and second half 406 are positioned on opposite sides of monorail 407. First half 404 and second half 406 seal against a workpiece (not depicted) suspended from monorail 407 prior to performing laser ablation on the workpiece.

As depicted, laser ablation work head 408 is present within first half 404. Laser ablation work head 408 performs laser ablation on a first side of the workpiece. As depicted, laser ablation work head 410 is present within second half 406. Laser ablation work head 410 performs laser ablation on a second side of the workpiece.

First half 404 travels along track 412 to relocate relative to a workpiece. Second half 406 travels along track 414 to relocate relative to the workpiece.

Each of track 412 and track 414 provides the ability to drive a respective half of carriage 400 down the full travel range of the linear axis, independently from the other. In some illustrative examples, cables for utilities, such as power, may extend through track 412 and track 414. In some illustrative examples, cables for utilities may include at least one of power cables, communication cables, coolant lines, laser fibers, pneumatic lines, water lines, or any other desirable type of resources. In these illustrative examples, track 412 and track 414 may be referred to as power tracks.

In some illustrative examples, track 412 and track 414 may physically separate different utility cables from each other. In some illustrative examples, track 412 and track 414 may physically separate power cables, communication cables, coolant lines, and laser fibers from each other. In some illustrative examples, track 412 and track 414 physically separate power cables, communication cables, coolant lines, and laser fibers from each other by a minimum of two inches.

The utility cables each have independent physical specifications. In some illustrative examples, track 412 and track 414 take into account the physical specifications of each type of utility cables. In one illustrative example, track 412 and track 414 each prohibit flexing beyond the minimum bending radius limit specified by the laser fiber. All utility cables that run through track 412 and track 414 meet industrial manufacturing standards. In one illustrative example, the utility cables are flex-rated, suitable for industrial environments, insulated, and noncombustible.

The two halves of carriage 400 work in tandem for all normal production modes. In some illustrative examples, the two halves of carriage 400, first half 404 and second half 406, are capable of traveling independently of each other. In some illustrative examples, first half 404 and second half 406 are independently movable relative to a workpiece to facilitate access for inspection and cleaning.

Figure 5:
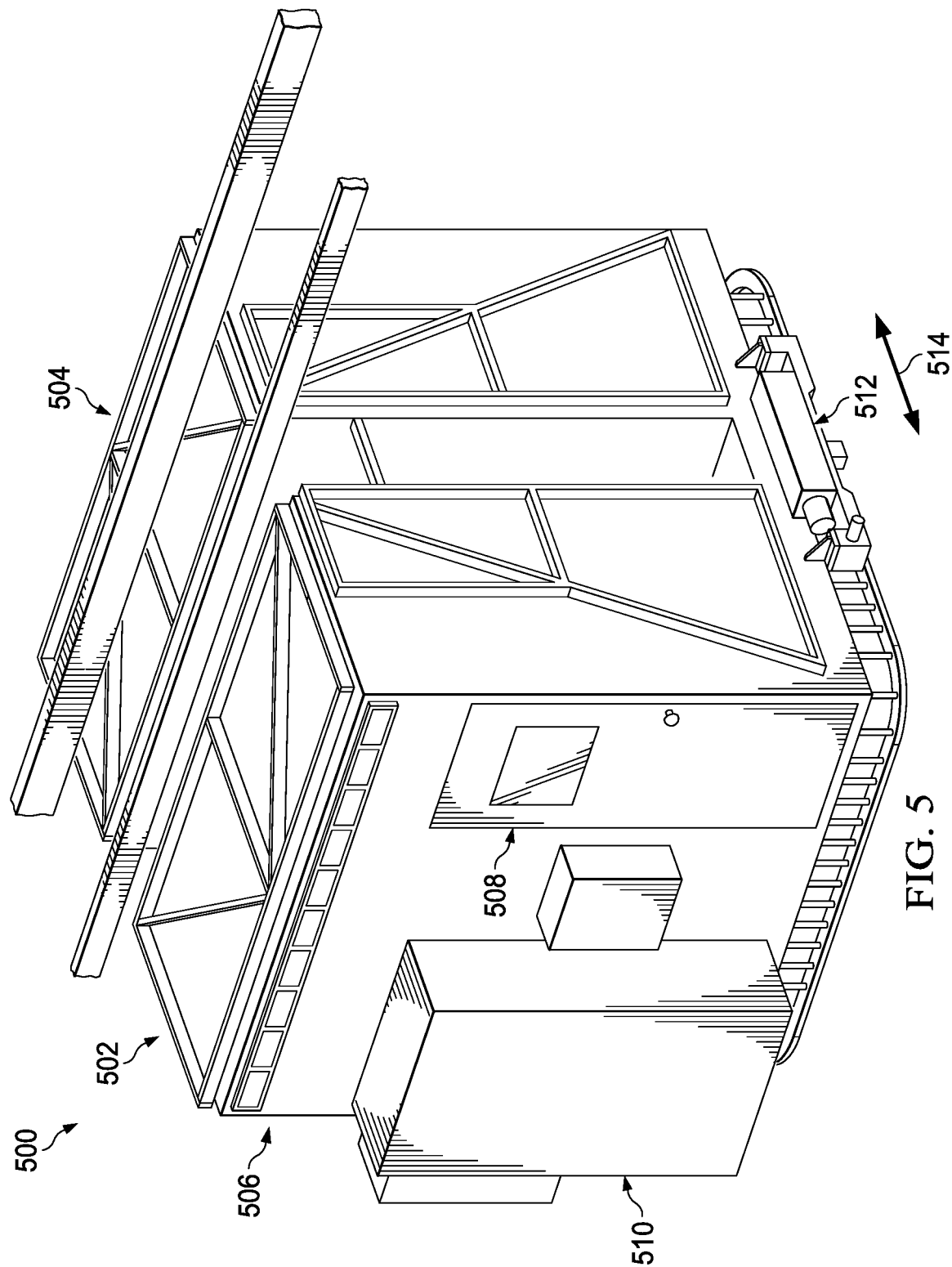
FIG. 5 is an illustration of an isometric view of a carriage of a laser ablation system in accordance with an illustrative embodiment.

Turning now to FIG. 5, an illustration of an isometric view of a carriage of a laser ablation system is depicted in accordance with an illustrative embodiment. Carriage 500 is a physical implementation of carriage 116 of FIG. 1. Carriage 500 may be an implementation of carriage 208 of FIG. 2. Carriage 500 may be an implementation of carriage 308 of FIG. 3. Carriage 500 may be an implementation of carriage 400 of FIG. 4.

As depicted, carriage 500 comprises laser enclosure 502 having first half 504 and second half 506. As depicted, laser enclosure 502 has operator access door 508 for entering laser enclosure 502 to perform maintenance. As depicted, utilities enclosure 510 is attached to laser enclosure 502. In some illustrative examples, utilities enclosure 510 is an electrical enclosure for supporting a laser ablation work head (not depicted) inside of laser enclosure 502.

In some illustrative examples, first half 504 and second half 506 are substantially the same. In these illustrative examples, each of first half 504 and second half 506 may enclose a respective laser ablation work head. In these illustrative examples, support structures for each of respective laser ablation work head is provided for each half of laser enclosure 502.

In other illustrative examples, laser enclosure 502 is asymmetrical. In some illustrative examples, laser enclosure 502 is asymmetrical as carriage 500 contains only one laser ablation work head. In these illustrative examples, support structures, such as utilities enclosure 510, are different between first half 504 and second half 506 of laser enclosure 502.

Movement system 512 provides linear motion of components of first half 504 and second half 506 of laser enclosure 502. Movement system 512 moves components of first half 504 and second half 506 towards or away from a workpiece in direction 514 to clamp the workpiece.

Figure 6:
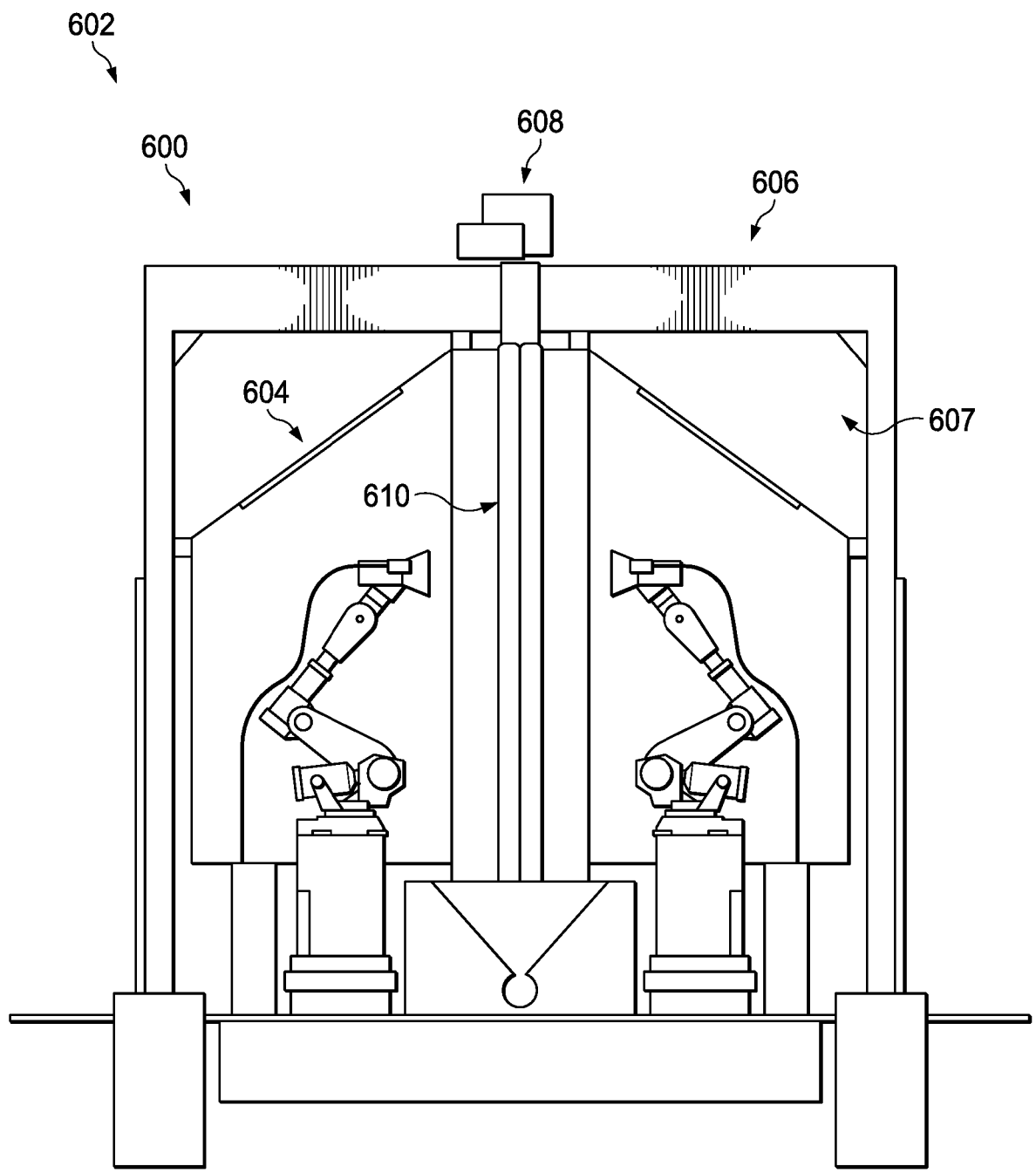
FIG. 6 is an illustration of a front view of a carriage of a laser ablation system with dual laser ablation work heads while the carriage is clamped onto a workpiece in accordance with an illustrative embodiment.

Turning now to FIG. 6, an illustration of a front view of a carriage of a laser ablation system with dual laser ablation work heads while the carriage is clamped onto a workpiece is depicted in accordance with an illustrative embodiment. Laser ablation system 600 in view 602 is a physical implementation of laser ablation system 102 of FIG. 1. View 602 may be a front view of carriage 208 working within laser ablation system 200 of FIG. 2. View 602 may be a front view of laser ablation system 302 shown in floor plan 300 of FIG. 3. In some illustrative examples, view 602 of carriage 604 is a view of carriage 400 of FIG. 4. In some illustrative examples, view 602 of carriage 604 is a view of carriage 500 of FIG. 5.

As depicted, safety perimeter 606 surrounds volume 607 of laser ablation system 600. Safety perimeter 606 is not light-tight.

Carriage 604 provides a working environment for performing laser ablation processes on a workpiece. The workpiece is suspended from monorail 608. Clamping system 610 of carriage 604 immobilizes the workpiece for laser ablation and seals against the workpiece to prevent escape of laser energy or effluent from the laser ablation process.

In view 602, carriage 604 is clamped against a workpiece. In view 602, carriage 604 remains stationary relative to the workpiece as laser ablation is performed inside of the working environment within carriage 604.

Figure 7:
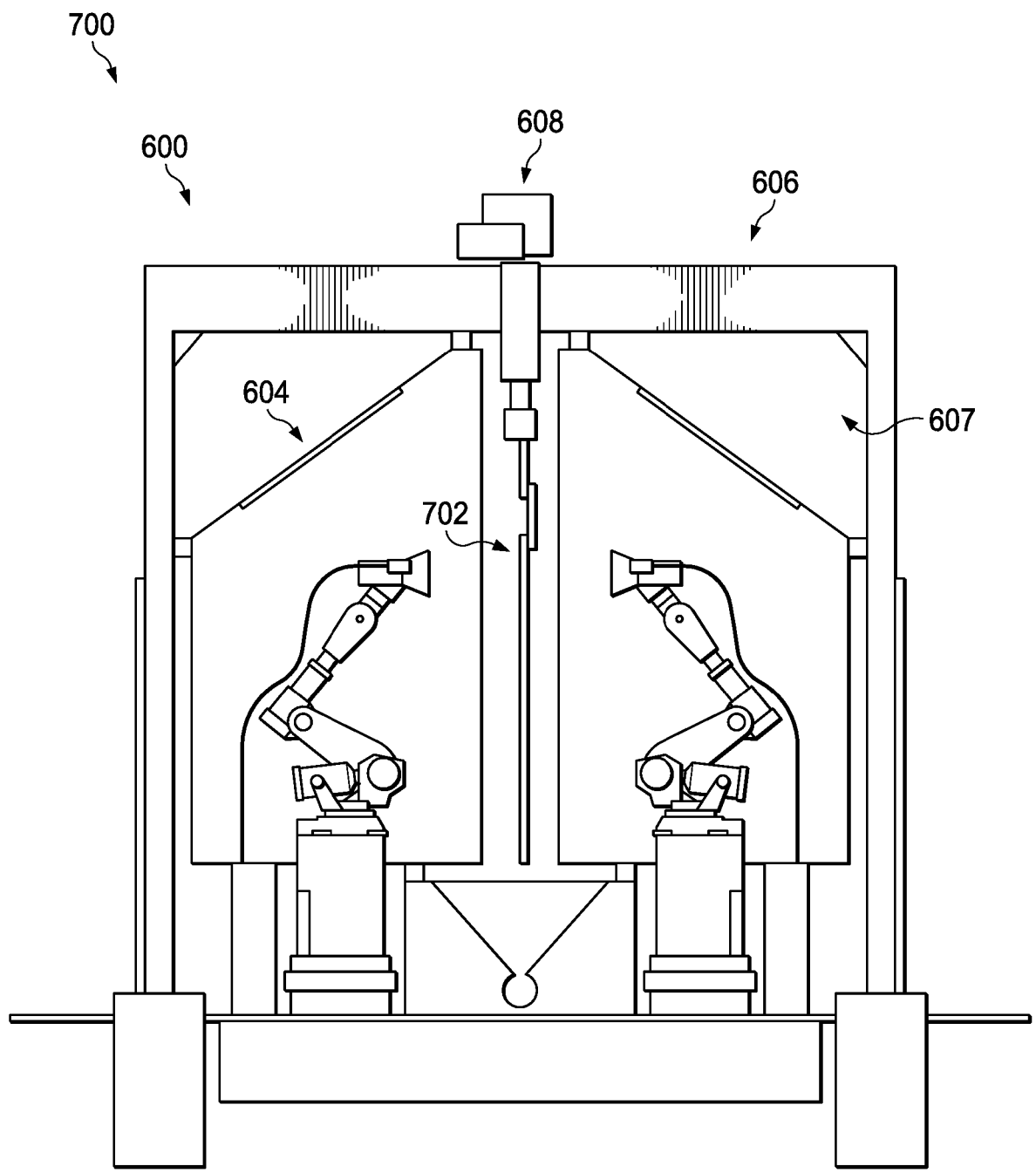
FIG. 7 is an illustration of a front view of a carriage of a laser ablation system with dual laser ablation work heads while the carriage is open in accordance with an illustrative embodiment.

Turning now to FIG. 7, an illustration of a front view of a carriage of a laser ablation system with dual laser ablation work heads while the carriage is open is depicted in accordance with an illustrative embodiment. View 700 is a view of carriage 604 of FIG. 6 in an "open" or "unclamped" position.

In view 700, workpiece 702 is visible. In view 700, clamping system 610 of FIG. 6 is not visible. In view 700, clamping system 610 has been retracted such that carriage 604 may move relative to workpiece 702.

In one illustrative example, in view 700, carriage 604 may move into or out of the page to reposition and clamp onto a different portion of workpiece 702. By repositioning and clamping onto a different portion of workpiece 702, carriage 604 may step across workpiece 702.

In another illustrative example, in view 700, workpiece 702 may be moved into or out of the page to remove workpiece 702 from volume 607. In yet another illustrative example, in view 700, one half of carriage 604 may move independently to allow for at least one of inspection or maintenance.

Figure 8:
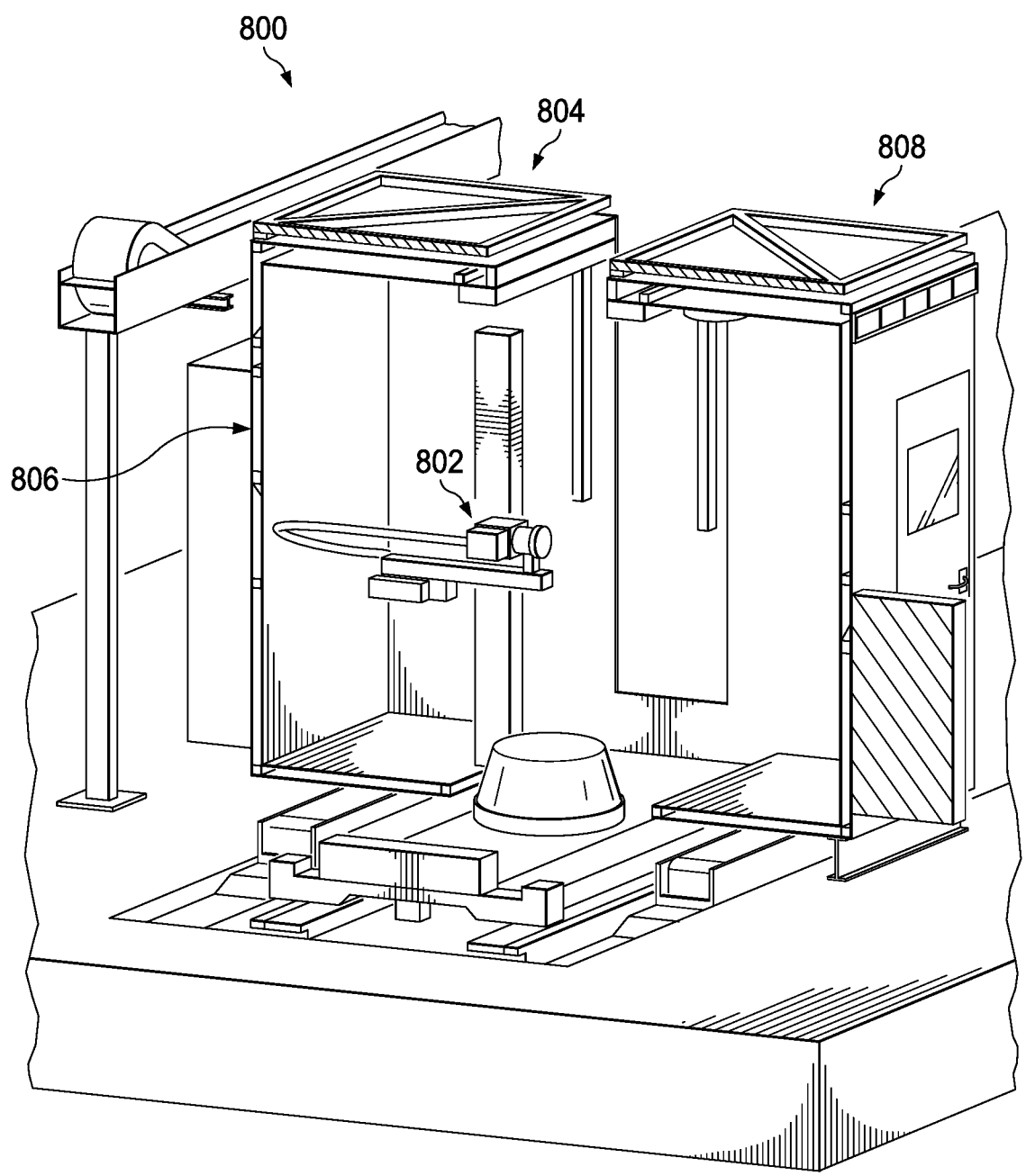
FIG. 8 is an illustration of an isometric view of an interior of a carriage of a laser ablation system with one laser ablation work head in accordance with an illustrative embodiment.

Turning now to FIG. 8, an illustration of an isometric view of an interior of a carriage of a laser ablation system with one laser ablation work head is depicted in accordance with an illustrative embodiment. Carriage 800 is a physical implementation of carriage 116 of FIG. 1. Carriage 800 may be an implementation of carriage 208 of FIG. 2. Carriage 800 may be an implementation of carriage 308 of FIG. 3. Carriage 800 may be an implementation of carriage 500 of FIG. 5. Carriage 800 may be an implementation of either carriage 908 or carriage 910 of laser ablation system 900 of FIG. 9.

Carriage 800 is a physical implementation of a carriage with a single laser ablation work head. Laser ablation work head 802 moves into either first half 804 of laser enclosure 806 or second half 808 of laser enclosure 806 depending on a desired side of a workpiece to receive processing.

Figure 9:
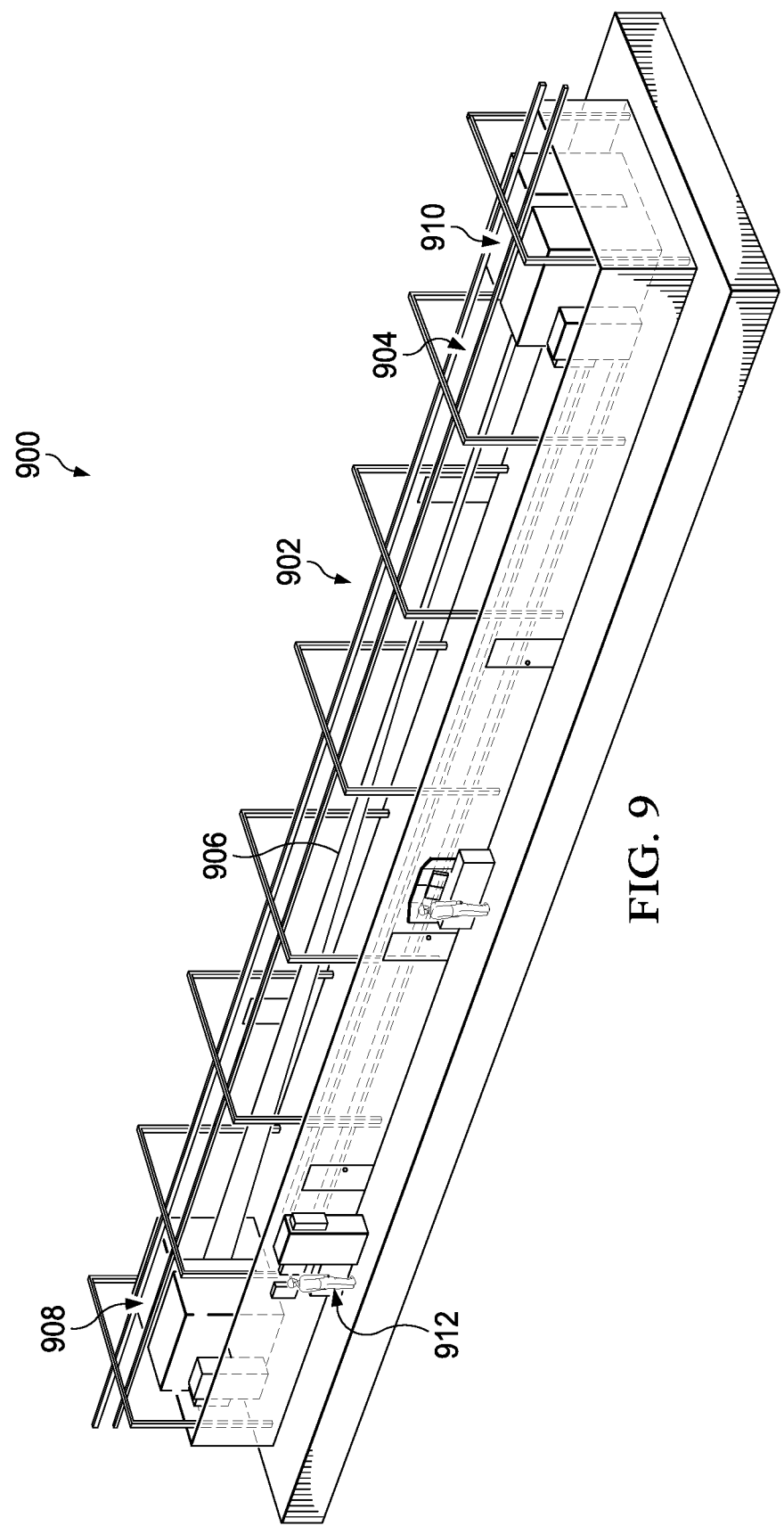
FIG. 9 is an illustration of an isometric view of a laser ablation system with two carriages in accordance with an illustrative embodiment.

Turning now to FIG. 9, an illustration of an isometric view of a laser ablation system with two carriages is depicted in accordance with an illustrative embodiment. Laser ablation system 900 is a physical implementation of laser ablation system 102 of FIG. 1. Laser ablation system 900 comprises safety perimeter 902 surrounding volume 904 configured to contain workpiece 906, carriage 908 configured to create a working environment for laser ablation within volume 904, and an effluent extraction system.

Volume 904 is configured to contain workpiece 906 by being large enough to hold workpiece 906. Further, volume 904 is large enough to contain carriage 908 and carriage 910 in addition to workpiece 906. In some illustrative examples, carriage 910 may be referred to as a second carriage.

Safety perimeter 902 is configured to restrict operator entry. As depicted, safety perimeter 902 is configured to restrict operator 912 from entering volume 904 during laser ablation processes. Safety perimeter 902 is light penetrable. Safety perimeter 902 does not restrict laser emissions.

Carriage 908 is configured to move within volume 904 relative to workpiece 906. Carriage 910 is configured to move within volume 904 relative to workpiece 906.

Each of carriage 908 and carriage 910 comprises a clamping system, a light-tight laser enclosure, and a laser ablation work head within the laser enclosure. The clamping system is configured to clamp workpiece 906 and seal against a portion of workpiece 906. When carriage 908 and carriage 910 both simultaneously work on workpiece 906, a respective clamping system for carriage 908 seals against a first portion of workpiece 906 while a respective clamping system for carriage 910 seals against a second portion of workpiece 906. In some illustrative examples, carriage 908 and carriage 910 may work on different workpieces substantially simultaneously. Each clamping system is configured to create a light-tight seal to block laser emissions and to create a negative pressure differential to prevent the escape of effluent.

Although not depicted, laser ablation system 900 also comprises an effluent extraction system configured to remove effluent from within carriage 908 and carriage 910. The effluent extraction system may contain components outside of volume 904, inside of volume 904, or some combination of the two.

Figure 10:
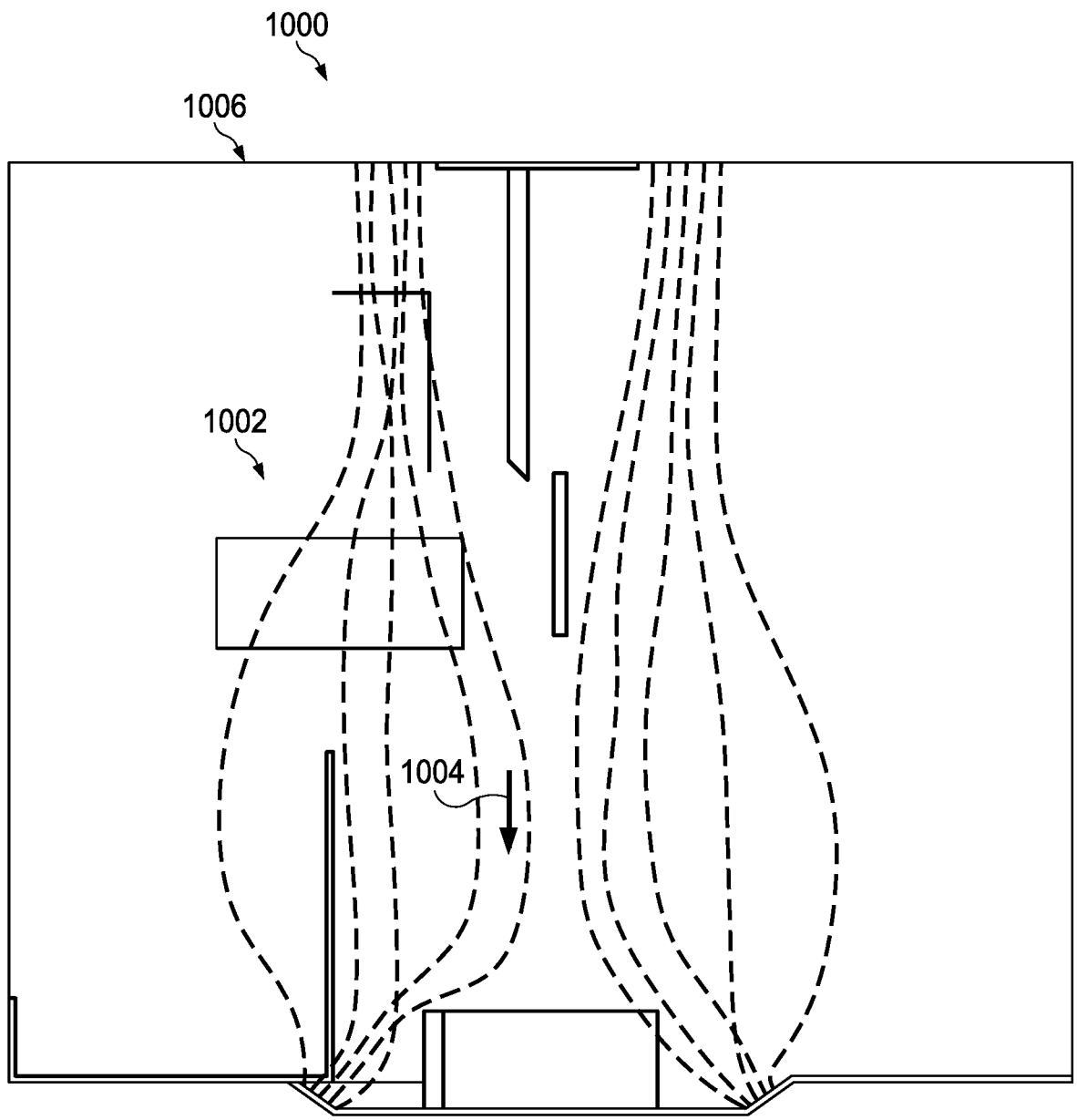
FIG. 10 is an illustration of a cross-sectional view of air flow within a carriage due to air knifes in accordance with an illustrative embodiment.

Turning now to FIG. 10, an illustration of a cross-sectional view of representative air flow within a carriage due to air knifes is depicted in accordance with an illustrative embodiment. View 1000 is a physical representation of a cross-sectional view through carriage 116 of FIG. 1. View 1000 is a physical representation of a cross-sectional view of air flow due to air knife 162 of FIG. 1.

View 1000 may be a cross-sectional view of airflow within carriage 208 of FIG. 2 due to directed airflow. View 1000 may be a cross-sectional view of airflow within carriage 400 of FIG. 4. View 1000 may be a cross-sectional view of airflow within carriage 500 of FIG. 5. View 1000 may be a cross-sectional view of airflow within carriage 800 of FIG. 8. View 1000 may be a cross-sectional view of airflow within either of carriage 908 or carriage 910 of FIG. 9.

In view 1000, air is directed across the working surface of a workpiece to ensure rapid removal of the plasma plume. As depicted, air knifes create laminar flow 1002 amplifying and guiding intake air in downward direction 1004. Laminar flow 1002 directs effluent towards exhaust ductwork. Laminar flow 1002 directs effluent away from the number of laser ablation work heads in carriage 1006. Laminar flow 1002 also removes residual effluent from the surface of the workpiece.

Figure 11:
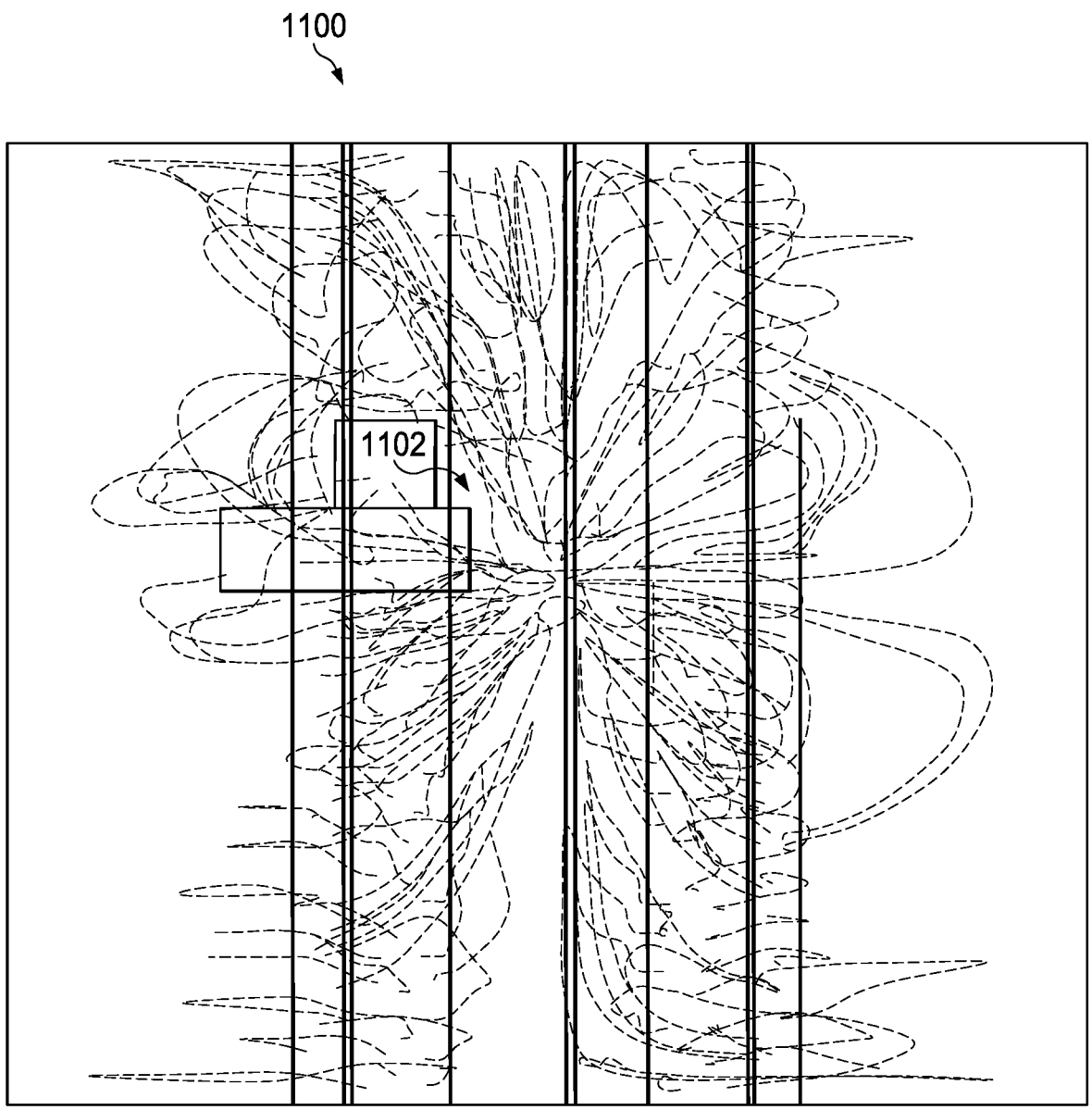
FIG. 11 is an illustration of a cross-sectional view of air flow within a carriage due to air nozzles near an ablation work head in accordance with an illustrative embodiment.

Turning now to FIG. 11, an illustration of a cross-sectional view of air flow within a carriage due to air nozzles near an ablation work head is depicted in accordance with an illustrative embodiment. View 1100 is a physical representation of a cross-sectional view through carriage 116 of FIG. 1. View 1100 is a physical representation of a cross-sectional view of air flow due to forced air nozzle 164 of FIG. 1.

View 1100 may be a cross-sectional view of airflow within carriage 208 of FIG. 2. View 1100 may be a cross-sectional view of airflow within carriage 400 of FIG. 4. View 1100 may be a cross-sectional view of airflow within carriage 500 of FIG. 5. View 1100 may be a cross-sectional view of airflow within carriage 800 of FIG. 8. View 1100 may be a cross-sectional view of airflow within either of carriage 908 or carriage 910 of FIG. 9.

In view 1100, air flow 1102 is directed towards the ablation site on the workpiece. In view 1100, air flow 1102 is directed towards the field of view of a laser ablation work head, such as laser ablation work head 122 of FIG. 1. Air flow 1102 prevents effluent from remaining on the workpiece after laser ablation. Air flow 1102 is configured such that air flow 1102 does not create additional contamination to the laser ablation work head.

The different components shown in FIGS. 2-11 may be combined with components in FIG. 1, used with components in FIG. 1, or a combination of the two. Additionally, some of the components in FIGS. 2-11 may be illustrative examples of how components shown in block form in FIG. 1 can be implemented as physical structures.

Figure 12:
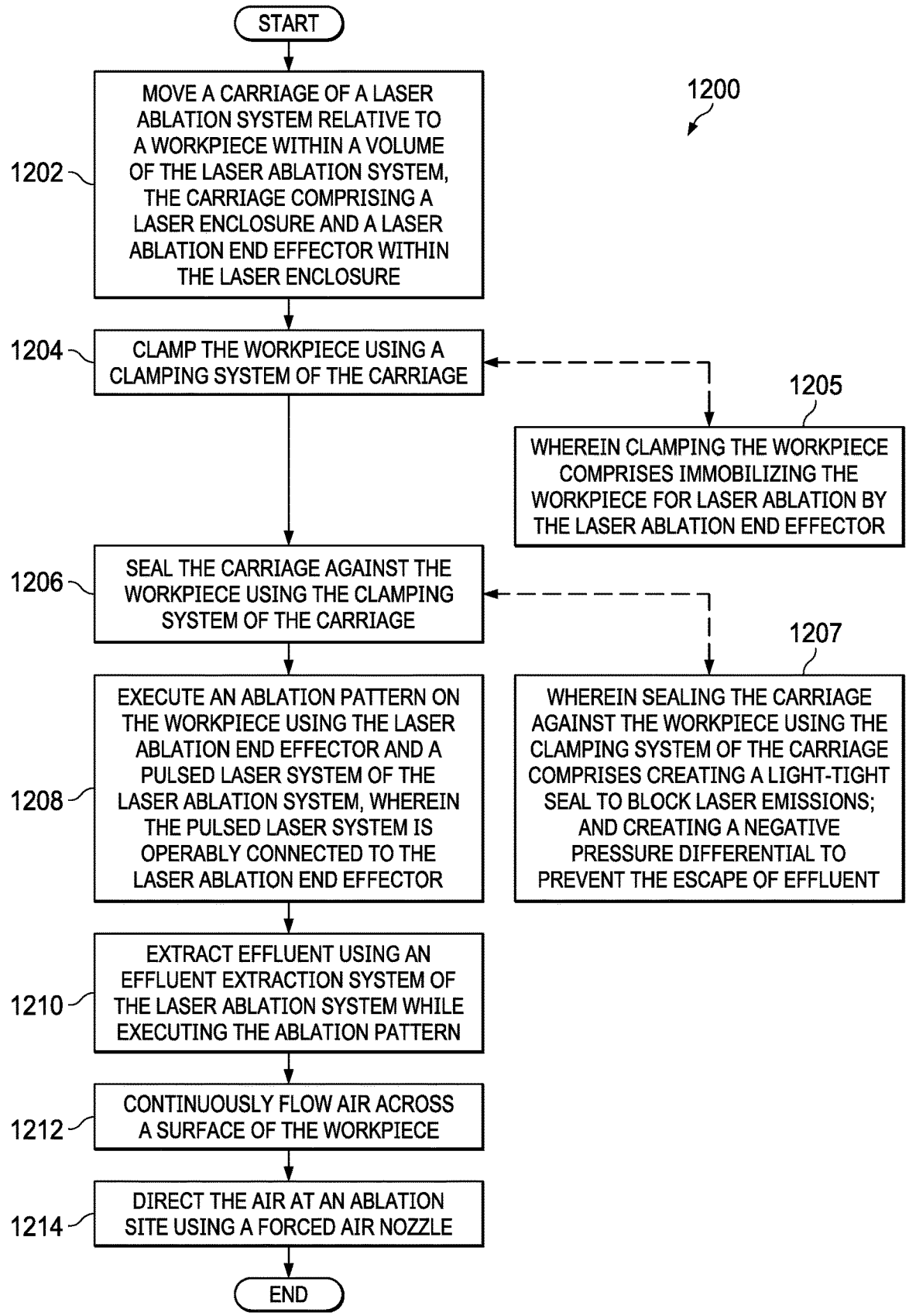
FIG. 12 is an illustration of a flowchart of a method for performing laser ablation within in a moveable carriage in accordance with an illustrative embodiment.

Turning now to FIG. 12, an illustration of a flowchart of a method for performing laser ablation within in a moveable carriage is depicted in accordance with an illustrative embodiment. Method 1200 may be performed using laser ablation system 102 of FIG. 1. Method 1200 may be performed using laser ablation system 200 of FIG. 2. Method 1200 may be implemented using laser ablation system 900 of FIG. 9.

Method 1200 moves a carriage of a laser ablation system relative to a workpiece within a volume of the laser ablation system, the carriage comprising a laser enclosure and a laser ablation work head within the laser enclosure (operation 1202). Method 1200 clamps the workpiece using a clamping system of the carriage (operation 1204). In some illustrative examples, clamping the workpiece comprises immobilizing the workpiece for laser ablation by the laser ablation work head (operation 1205).

Method 1200 seals the carriage against the workpiece using the clamping system of the carriage (operation 1206). In some illustrative examples, sealing the carriage against the workpiece using the clamping system of the carriage comprises creating a light-tight seal to block laser emissions; and creating a negative pressure differential to prevent the escape of effluent (operation 1207).

Method 1200 executes an ablation pattern on the workpiece using the laser ablation work head and a pulsed laser source of the laser ablation system, wherein the pulsed laser source is operably connected to the laser ablation work head (operation 1208). Method 1200 extracts effluent using an effluent extraction system of the laser ablation system while executing the ablation pattern (operation 1210).

In some illustrative examples, method 1200 also continuously flows air across a surface of the workpiece (operation 1212). In these illustrative examples, the continuous flow of air directs effluent from the laser ablation process towards an effluent extraction system. In some illustrative examples, the continuous flow of air directs the effluent downwards.

In some illustrative examples, method 1200 further comprises directing air at an ablation site using a forced air nozzle (operation 1214). By directing air at an ablation site, effluent is directed away from the laser ablation work head.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1200 are performed. For example, in some cases, air is not continuously flowed across the surface of the workpiece as in operation 1212. In some illustrative examples, air flows across the surface in a non-continuous fashion.

The system described by this specification will use a laser to remove coatings, such as corrosion-resistant finishes from aluminum aerospace parts in precise geometries to create ground bond contact areas. The system described by this specification uses a pulsed laser to remove coatings, such as a corrosion-inhibiting coating, in precise geometries. In some illustrative examples, the system may remove a coating for the purposes of creating ground bond contacts.

In some illustrative examples, individual parts are free-hanging, suspended by an overhead monorail system. A laser enclosure with dual positioners translates down the length of the part, stopping at programmed locations to execute the ablation process. A soft-clamping system immobilizes the part, blocks laser emissions and contains the ablated effluent. Machine vision is used to locate key features of the part and then precision-align each positioner. Scanning laser optics ablate the primer while effluent and fumes are swept away by downward airflow. A separator cyclone and fume extraction system capture debris and fumes. A camera system performs a production quality assurance (QA) inspection of each pattern before moving onto the next location. The laser enclosure seals against the workpiece, providing mechanical stabilization and a physical barrier to contain laser light and generated effluent.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A laser ablation system that comprises:
   a volume configured to contain a workpiece; and
   a carriage configured to move within the volume relative to the workpiece, such that the carriage comprises:
   a clamping system configured to clamp the workpiece and seal against a portion of the workpiece;
   a laser enclosure that comprises two opposing halves; and
   a laser ablation work head within the laser enclosure.

2. The laser ablation system of claim 1, further comprising:
   a movement system configured to move the workpiece into the volume of the laser ablation system.

3. The laser ablation system of claim 2, wherein the movement system is a monorail, wherein the workpiece is suspended from the monorail, and wherein the clamping system is configured to immobilize the workpiece for laser ablation by the laser ablation work head.

4. The laser ablation system of claim 1 further comprising:
   a safety fence surrounding a perimeter of the volume.

5. The laser ablation system of claim 4 further comprising:
   an operator station positioned outside of the safety fence.

6. The laser ablation system of claim 1, wherein the clamping system is configured to create a light-tight seal configured to block laser emissions and to create a negative pressure differential to prevent escape of effluent.

7. The laser ablation system of claim 1, wherein the carriage further comprises an air flow system configured to create laminar flow of air across the workpiece, and wherein the air flow system is configured to move effluent towards an effluent extraction system.

8. The laser ablation system of claim 1, wherein the carriage further comprises a second laser ablation work head.

9. The laser ablation system of claim 1 further comprising:
   a second carriage configured to move within the volume relative to the workpiece, the second carriage comprising:
   a second clamping system configured to clamp the workpiece and seal against the workpiece;
   a second laser enclosure; and
   a second laser ablation work head within the second laser enclosure.

10. The laser ablation system of claim 1 further comprising:
    a pulsed laser source operably connected to the laser ablation work head; and
    an effluent extraction system, wherein the effluent extraction system is positioned outside of the volume.

11. A method comprising:
    moving a carriage of a laser ablation system relative to a workpiece within a volume of the laser ablation system, the carriage comprising a laser enclosure comprising two opposing halves and a laser ablation work head within the laser enclosure;
    clamping the workpiece using a clamping system of the carriage;
    sealing the carriage against the workpiece using the clamping system of the carriage;
    executing an ablation pattern on the workpiece using the laser ablation work head and a pulsed laser source of the laser ablation system, wherein the pulsed laser source is operably connected to the laser ablation work head; and
    extracting an effluent using an effluent extraction system of the laser ablation system while executing the ablation pattern.

12. The method of claim 11 further comprising:
    continuously flowing air across a surface of the workpiece.

13. The method of claim 12 further comprising:
    directing air at an ablation site using a forced air nozzle.

14. The method of claim 11, wherein clamping the workpiece comprises:
    immobilizing the workpiece for laser ablation by the laser ablation work head.

15. The method of claim 11, wherein sealing the carriage against the workpiece using the clamping system of the carriage comprises:
    creating a light-tight seal to block laser emissions; and
    creating a negative pressure differential to prevent an escape of the effluent.

16. The method of claim 11, further comprising moving the carriage along a monorail.

17. The method of claim 11, further comprising moving a second carriage of the laser ablation system relative to the workpiece within the volume, the second carriage comprising a second laser ablation work head.

18. A laser ablation system that comprises:
    a carriage configured to:
    create a working environment for laser ablation; and
    move relative to a workpiece, such that the working environment is smaller than the workpiece, and the carriage comprises:
    a clamping system configured to:
    seal against a portion of the workpiece;
    secure the workpiece;
    create a light-tight seal to block laser emission; and
    create a negative pressure differential that prevents the escape of the effluent;
    a light-tight laser enclosure that comprises two opposing halves; and
    a laser ablation work head within the light-tight laser enclosure; and
    an effluent extraction system configured to remove effluent from within the light-tight laser enclosure.

19. The laser ablation system of claim 18, wherein the carriage further comprises a second laser ablation work head.

20. The laser ablation system of claim 18, further comprising a monorail configured to support the carriage.

* * * * *